Nov. 23, 1937.    M. M. METCALF    2,099,701
STEAM ACTUATED POPPET VALVE GEAR FOR RECIPROCATING PUMPING ENGINES
Filed July 23, 1936    3 Sheets-Sheet 1

INVENTOR
MILTON M. METCALF
BY
ATTORNEY

Nov. 23, 1937.   M. M. METCALF   2,099,701
STEAM ACTUATED POPPET VALVE GEAR FOR RECIPROCATING PUMPING ENGINES
Filed July 23, 1936   3 Sheets-Sheet 2
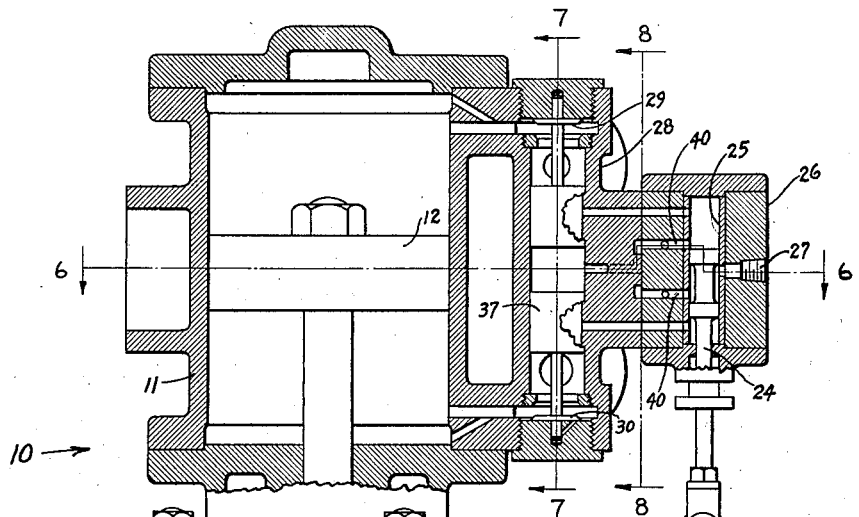
Fig. 2.
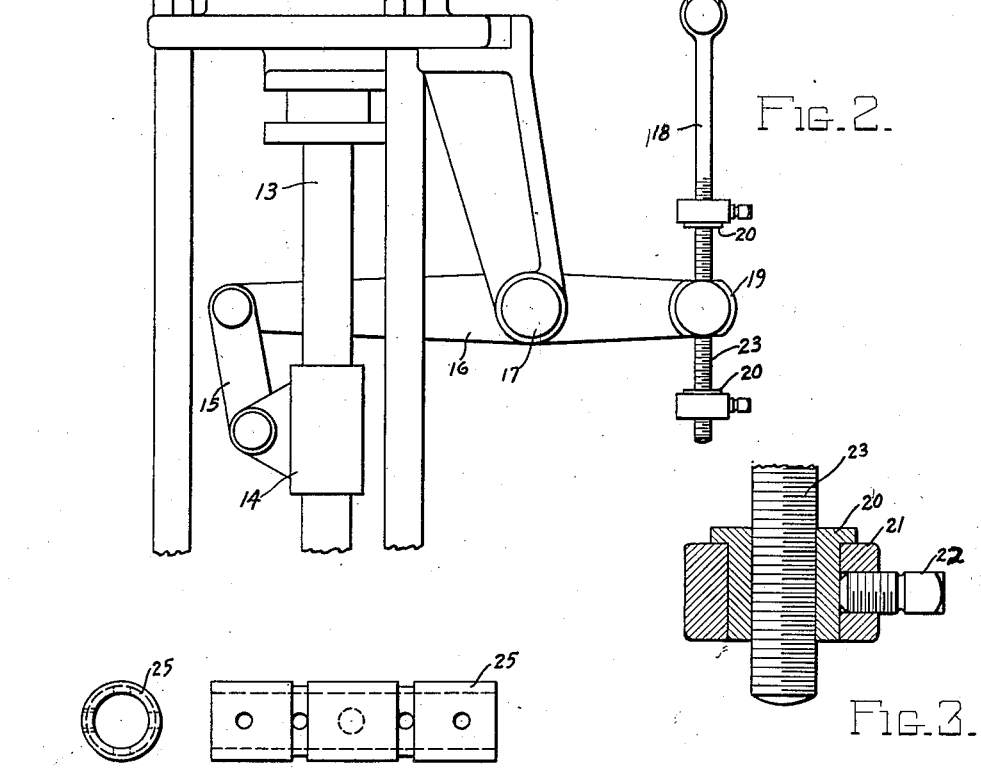
Fig. 3.
Fig. 5.   Fig. 4.
INVENTOR
MILTON M. METCALF
BY
ATTORNEY

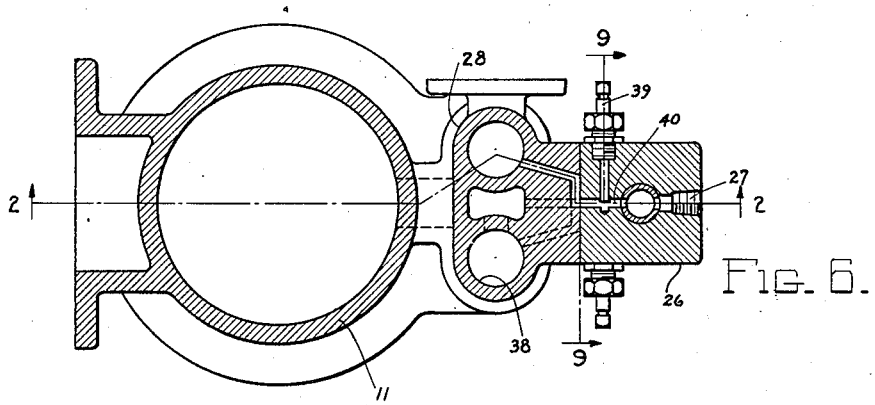
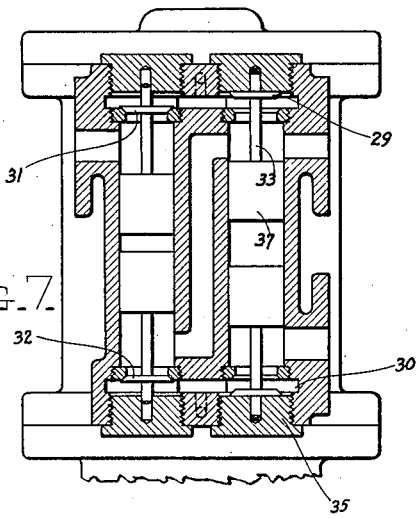
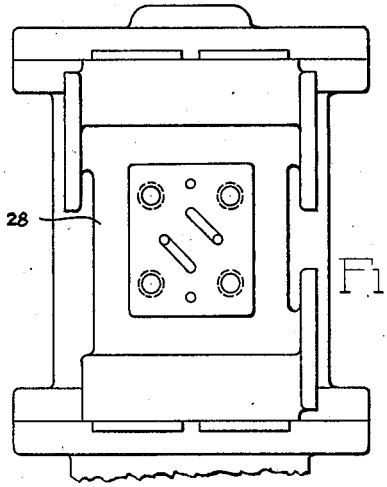
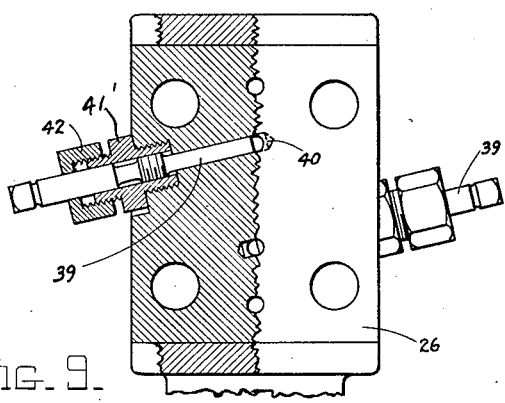
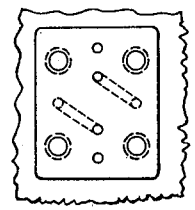

UNITED STATES PATENT OFFICE 2,099,701

STEAM ACTUATED POPPET VALVE GEAR FOR RECIPROCATING PUMPING ENGINES

Milton M. Metcalf, Vallejo, Calif.

Application July 23, 1936, Serial No. 92,134

13 Claims. (Cl. 121—157)

(Granted under the act of March 3, 1883, as amended April 30, 1928; 370 O. G. 757)

This invention relates to a steam actuated poppet valve gear for a reciprocating pumping engine and has for an object to provide a steam pumping engine with a poppet valve gear, wherein the poppet valve is automatically opened and closed by the steam coming from a pilot valve without the use of any mechanical connection to the poppet valves.

A further object of this invention is to provide a poppet valve gear for a steam pumping engine which will be of greater volumetric efficiency than the conventional slide valve or piston valve usually used in steam pumping engines.

A further feature of this invention is that standard automotive internal combustion engine poppet valves and seats may be used as part of the construction of this invention. Poppet valves of this nature can be easily ground to a good seat, thereby insuring tightness on the seats, and are easy to overhaul and replace when necessary. Furthermore, the seats, as well as the valves, are easily replaceable, and being thus easily removable may be made of much harder material than the remainder of the gear, thereby insuring long life and reliability, and permitting the pumping engine to be run at slower speeds.

A further advantage of this invention is that existing pumping engines may be fitted with this type of valve gear without re-designing the mechanism for operating the pilot valve.

With the foregoing and other objects in view, as will hereinafter become apparent, this invention comprises the structures, combinations and arrangements of parts hereinafter disclosed, claimed and illustrated in the accompanying drawings, wherein, Fig. 1 is a development of one steam cylinder with its two poppet valve chests and one auxiliary pilot valve cylinder of this invention;

Fig. 2 is an elevational partly sectional view of the steam cylinder pilot valve chest and one of the poppet valve chests, being taken on line 2—2 of Fig. 6;

Fig. 3 is a sectional view of the adjustable stop on the valve rod link;

Fig. 4 is an elevational view of the pilot valve cylinder liner;

Fig. 5 is an end view of Fig. 4;

Fig. 6 is a sectional view on line 6—6 of Fig. 2;

Fig. 7 is a sectional view on line 7—7 of Fig. 2;

Fig. 8 is a view taken on line 8—8 of Fig. 2;

Fig. 9 is a sectional view taken on line 9—9 of Fig. 6, and

Fig. 10 is an elevational view of the face of the poppet valve chest that contacts with the pilot valve chest.

Figure 1:
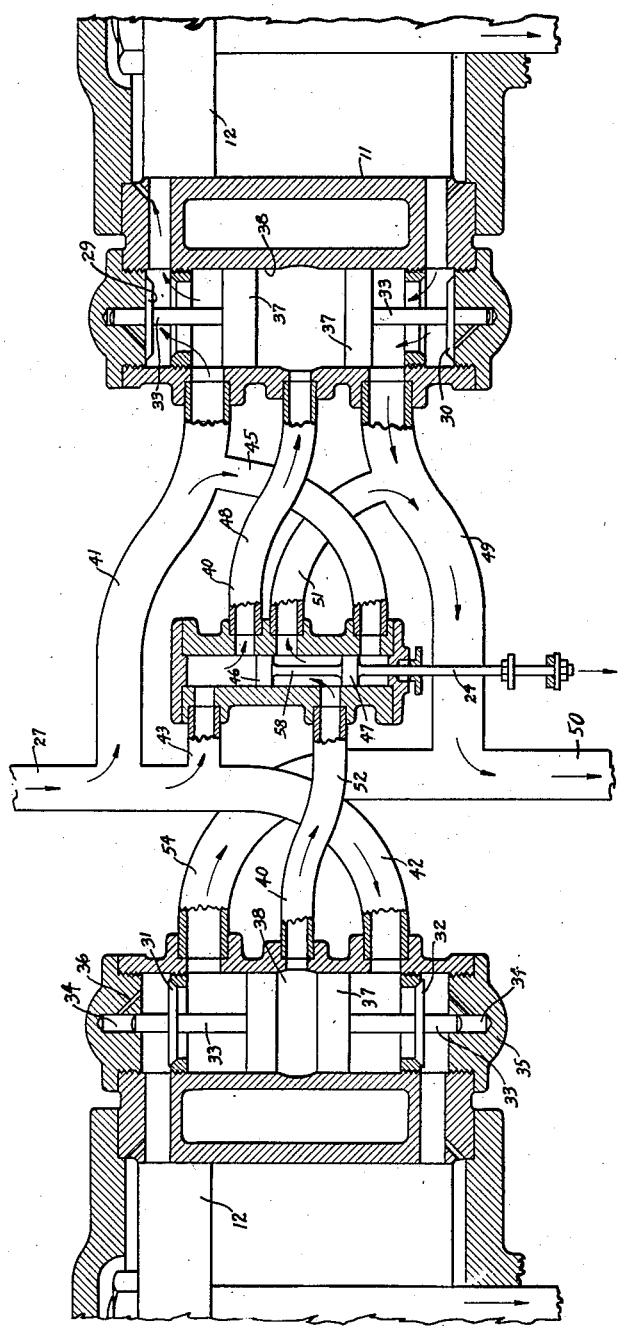

There is shown at 10 a reciprocating pumping engine, including a steam cylinder 11 wherein there is operated a piston 12, having a connecting rod 13 whose other end is secured to a pump mechanism (not shown). This connecting rod 13 carries the usual sleeve bracket 14 and link 15 to the lever 16 pivoted on the fulcrum 17 for actuating the pilot valve link 18. The end 19 of the lever 16 reciprocates on the pilot valve link 18 between the adjustable stops 20, which are held in position by the split nut 21 and set screw 22 on the threaded portion 23 of the pilot valve link 18. As the piston 12 is moved up and down it thus serves to automatically time the movement of the pilot valve 24 within liner 25 in valve chest 26 in the conventional manner, the valve chest 26 receiving the steam through the conduits 43 and 45 and feeding it through the appropriate conduits. Between the pilot valve chest 26 and the cylinder 11 is the poppet valve chest 28 having two cylinders 38 containing the four poppet valves consisting of the upper right poppet valve 29, the lower right poppet valve 30, the upper left poppet valve 31 and the lower left poppet valve 32. Each poppet valve is mounted on a valve stem 33 which extends therethrough into a stem guide aperture 34 extending into a cylinder head 35, which is threaded into the end of the steam poppet valve chest 28. A bleed conduit 36 extends from about the midpoint of the aperture 34 so that the aperture 34 may guide the valve stem 33 and provide a cushioning pocket at the end thereof. The other end of the guide stem 33 has secured thereto a piston 37, which is operable within the cylinder 38 in the poppet valve steam chest 28, it being observed in Figs. 6 and 7 that each valve cylinder 38 has two poppet valves operable therein.

The pilot valve chest 26 is provided with adjustable steam control needles 39 extending into conduits 40 leading from the pilot valve chest 26 to the poppet valve chest 28. These control needles 39 are threaded through valve bonnets 41' and are held in adjustable position by means of the cap nut 42. The pilot valve 24 as controlled by lever 16 between the stops 20 serves to control the movement of the steam and exhaust to and from the poppet valves and steam cylinder. The needle valves, on the other hand, serve to control the rate at which the steam will pass to the chamber between the poppet valves, and thus while the pilot valve controls the time at which the poppet valves commence to move, the needle valve controls the rate of movement of the poppet valves once they have started to move. By properly adjusting the needle valves 39, it is thus possible to cause the poppet valves to open and close more quickly or more slowly, as may be desired, under particular conditions of operation.

In describing the operation, it will be particularly observed that the steam and the exhaust flow through the poppet valves is in one direction only, and that a steam valve is never an exhaust valve, or vice versa. Further, the poppet valves are controlled by the position of the pilot valve, and the adjustment of the control needles, and are actuated entirely by steam, and therefore are automatic in their operation. It will be further observed that the area of the faces of the poppet valve pistons 37 is about twice that of the area of the poppet valves 29 to 32. Poppet valves 29 and 32 are steam valves, while poppet valves 30 and 31 are exhaust valves. Steam enters the pilot valve chest 26 through the openings 43 and 45 and follows the path of the arrows through the various conduits therein, diagrammatically shown in Fig. 1. One steam conduit 41 leads to the bottom of the steam poppet valve 29, while a branch conduit 42 leads to the bottom of steam poppet valve 32. Another branch 43 leads to the top of the upper piston 46 of the pilot valve 24, while another branch 45 leads to the bottom of the lower piston 47 of the pilot valve 24, the pistons 46 and 47 being connected by a pilot valve stem 58. While the steam piston 12 is at the top of the steam cylinder 11 the pilot valve 24 will be at the bottom of its steam chest. Branch conduit 43 will then be connected through the pilot valve to conduit 48 leading live steam to the chamber in the cylinder 38 between the pistons 37 of the steam poppet valve 29 and exhaust poppet valve 30.

The steam thus in the cylinder 38 between pistons 37 opens poppet steam valve 29 and poppet exhaust valve 30, permitting the steam to enter into the cylinder 11 above the piston 12 and force it downwardly, and permits the exhaust below piston 12 in the cylinder 11 to exit through the conduit 49 to the exhaust 50. It will be also observed that a branch conduit 51 is connected by the pilot valve 24 while in the lower position to the conduit 52 which leads to the chamber in the cylinder 38 between the pistons of the poppet valves 31 and 32. The steam thus fed to the top of the piston 12 moves it down to the bottom of its stroke and the connecting rod 13 through lever 16 then shifts the position of the pilot valve 24 so as to connect the branch conduit 45 to the conduit 52 permitting live steam to enter between the pistons of valves 31 and 32, opening the same. At the same time conduits 48 and 51 are put into communication while conduit 43 is cut off from conduit 48. The steam previously holding the valves 29 and 30 open then escapes through conduits 48 and 51 to the exhaust conduit 49. The valves 31 and 32 thus held open by the pressure of the steam between their pistons, the steam enters from the conduit 42 to the bottom of piston 12, while the exhaust exits from the top of piston 12 through the conduit 54 to the exhaust 50. Meantime, the valves 29 and 30 have been automatically closed by the removal of steam between their pistons and the presence of live steam from the conduit 41 moving the piston of poppet valve 29 downwardly and the live steam in cylinder 11 let in below piston 12 by the opening of valve 32 moving the piston of poppet valve 30 upwardly to closed position, thus completing the cycle.

The pumping engine gear thus described has functioned very satisfactorily on tests at all speeds, the pumping engine showing remarkable ability to maintain a stated pressure, instantly reversing at full stroke on both high and low water pressures up to three hundred pounds per square inch. The steam actuated poppet valves opened and closed with precision with no evidence of steam leakage, thus proving that this gear requires less steam consumption than prior known conventional pumps. After a considerably lengthy test, the poppet valves were removed and upon examination showed no evidence of wear. Hence, the pump gear of this invention will serve much longer and more satisfactorily and need considerably less overhaul and repair than would a prior known slide valve type of pump gear. Not only is the expense of frequent overhaul of the pump gear thus diminished, but also the loss of revenue and the cost of overhaul during frequent laying up of the vessel in which the pump is installed, is considerably diminished, such cost and loss by laying up being many thousandfold the cost of the pump gear overhaul per se.

The invention described herein may be manufactured and used by or for the Government of the United States of America for governmental purposes without the payment of any royalties thereon or therefor.

I claim:

1. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end and an exhaust poppet valve at the other end.

2. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end and an exhaust poppet valve at the other end, each poppet valve having a valve stem and a piston within the cylinder.

3. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end and an exhaust poppet valve at the other end, each poppet valve having a valve stem and a piston within the cylinder, the area of either face of the piston being substantially greater than the area of either face of the poppet valve.

4. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end, and an exhaust poppet valve at the other end; each poppet valve having a valve stem and a piston within the cylinder, said valve stem extending through said poppet valve and a cylinder head removably secured in the end of the cylinder, said cylinder head having an aperture therein acting as a guide for the end of the valve stem, and a bleed line extending through said head to said aperture forming a valve stem cushion pocket at the end of said aperture.

5. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end, and an exhaust poppet valve at the other end, each poppet valve having a valve stem and a piston within the cylinder, one of the conduits to the poppet valve steam chest leading to the cylinder between the pistons therein, said conduits being alternately a pressure and an exhaust conduit, according to the location of the pilot valve.

6. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end, and an exhaust poppet valve at the other end, each poppet valve having a valve stem and a piston within the cylinder, one of the conduits to the poppet valve steam chest leading to the cylinder between the pistons therein, said conduits being alternately a pressure and an exhaust conduit, according to the location of the pilot valve, a steam conduit leading to the poppet valve cylinder between the steam poppet valve and its piston and an exhaust conduit leading from the poppet valve cylinder between the exhaust poppet valve and its piston.

7. A steam actuated poppet valve gear for a steam engine and a pilot valve controlled by the steam engine; said poppet valve gear including a poppet valve gear steam chest, conduits joining the pilot valve gear steam chest to the poppet valve steam chest and to the steam engine, said poppet valve gear having two poppet valve cylinders therein, each cylinder having a steam poppet valve at one end, and an exhaust poppet valve at the other end, each poppet valve having a valve stem and a piston within the cylinder, one of the conduits to the poppet valve steam chest leading to the cylinder between the pistons therein, said conduits being alternately a pressure and an exhaust conduit, according to the location of the pilot valve, and a control needle in each said conduit for adjustably controlling the rate of flow therethrough.

8. A poppet valve gear including a valve chest, a pair of cylinders in said valve chest, each cylinder having a steam valve at one end and an exhaust valve at the other end, each valve having a valve stem and a piston on said stem within the cylinder for operating the valve solely by steam pressure.

9. A poppet valve gear including a valve chest, a pair of cylinders in said valve chest, each cylinder having a steam valve at one end and an exhaust valve at the other end, each valve having a valve stem and a piston on said stem within the cylinder for operating the valve solely by steam pressure, a removable valve seat at each end of each cylinder and a removable cylinder head at each end of each cylinder permitting access to said valves and cylinders.

10. A poppet valve gear including a valve chest, a pair of cylinders in said valve chest, each cylinder having a steam valve at one end and an exhaust valve at the other end, each valve having a valve stem and a piston on said stem within the cylinder for operating the valve solely by steam pressure, a removable valve seat at each end of each cylinder and a removable cylinder head at each end of each cylinder permitting access to said valves and cylinders, each valve stem extending through and beyond its valve and each cylinder head having a valve stem guide aperture extending herein.

11. A poppet valve gear including a valve chest, a pair of cylinders in said valve chest, each cylinder having a steam valve at one end and an exhaust valve at the other end, each valve having a valve stem and a piston on said stem within the cylinder for operating the valve solely by steam pressure, a removable valve seat at each end of each cylinder, a removable cylinder head at each end of each cylinder permitting access to said valves and cylinders, each valve stem extending through and beyond its valve and each cylinder head having a valve stem guide aperture extending therein, and a bleed vent extending into said cylinder head to a point before the end of the aperture, whereby the end of the aperture provides a cushion pocket for the valve stem guided therein.

12. A poppet valve gear including a valve chest, a pair of cylinders in said valve chest, each cylinder having a steam poppet valve at one end, and an exhaust poppet valve at the other end, each valve having a piston within the cylinder, a steam conduit leading to each cylinder at the steam valve, an exhaust conduit leading from each cylinder at the exhaust valve, and a steam and exhaust conduit leading to the cylinder between the pistons of the steam valve and the exhaust valve whereby said poppet valves are operable solely by steam pressure.

13. A poppet valve gear including a valve chest, a pair of cylinders in said valve chest, each cylinder having a steam poppet valve at one end, and an exhaust poppet valve at the other end, each valve having a piston within the cylinder, a steam conduit leading to each cylinder at the steam valve, an exhaust conduit leading from each cylinder at the exhaust valve, and a steam and exhaust conduit leading to the cylinder between the pistons of the steam valve and the exhaust valve whereby said poppet valves are operable solely by steam pressure, the area of the faces of the pistons being substantially greater than the area of the faces of the valves.

MILTON M. METCALF.